US012702254B2

(12) United States Patent
Denning et al.

(10) Patent No.: US 12,702,254 B2

(45) Date of Patent: Aug. 11, 2026

(54) BAFFLE AND ASSOCIATED FRYER HEAT EXCHANGE SYSTEM AND FRYER

(71) Applicant: ILLINOIS TOOL WORKS INC., Glenview, IL (US)

(72) Inventors: Kacy W. Denning, Charlotte, NC (US); Matthew T. Rowell, Gastonia, NC (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 555 days.

(21) Appl. No.: 18/446,847

(22) Filed: Aug. 9, 2023

(65) Prior Publication Data

US 2024/0049913 A1 Feb. 15, 2024

Related U.S. Application Data

(60) Provisional application No. 63/397,197, filed on Aug. 11, 2022.

(51) Int. Cl.

*A47J 37/12* (2006.01)
*F23M 9/00* (2006.01)
*F28F 13/12* (2006.01)

(52) U.S. Cl.

CPC .......... *A47J 37/1247* (2013.01); *F23M 9/003* (2013.01); *F28F 13/12* (2013.01)

(58) Field of Classification Search

CPC ................ A47J 37/1247; A47J 37/1223; A47J 37/1242; A47J 37/1219; A47J 37/1238; A47J 37/1285; F23M 9/003; F28F 13/12; F28F 1/025; F28F 1/06; F28F 1/08; F28F 1/40; F28F 13/08; F23D 14/045; F23D 14/70; F23D 2213/00; F23D 2900/00017; F23D 2900/14641

See application file for complete search history.

(56) References Cited

U.S. PATENT DOCUMENTS 4,397,299 A 8/1983 Taylor
4,690,127 A 9/1987 Sank
4,895,137 A 1/1990 Jones
4,994,181 A 2/1991 Mullaney
6,196,118 B1 3/2001 Savage
6,235,210 B1 5/2001 Saksena
6,890,428 B2 5/2005 Mullaney
7,309,422 B2 12/2007 Mullaney
7,690,375 B2 4/2010 Ricord (Continued)

*Primary Examiner* — Veronica Martin

(74) *Attorney, Agent, or Firm* — THOMPSON HINE LLP

(57) ABSTRACT

A fryer includes a fryer vat and a heating system with at least one heat exchange tube a burner end, an opposite end, and an internal passage from the burner end to the opposite end. A baffle is located within the internal passage for enhancing heat transfer from combustion gases to the heat exchange tube. The baffle has an axial length from a burner facing end to a discharge facing end. The baffle includes a plurality baffle panels that are interconnected and sequentially arranged along the axial length, with each baffle panel extending at least partially across the internal passage of the heat exchange tube. At least one baffle panel includes multiple sets of interconnected openings, wherein the openings of each set are interconnected with each other by one or more panel through slits so as to facilitate thermal expansion.

20 Claims, 7 Drawing Sheets

(56) References Cited

U.S. PATENT DOCUMENTS

| | | | | |
|---|---|---|---|---|
| 7,698,994 | B2 | 4/2010 | Mullaney | |
| 7,704,387 | B2 | 4/2010 | Mullaney | |
| 8,163,098 | B2 | 4/2012 | Mullaney | |
| 8,931,403 | B2 | 1/2015 | Forrest | |
| 9,861,234 | B2 | 1/2018 | Forrest | |
| 2019/0125131 | A1 * | 5/2019 | Denning | A47J 37/1247 |

* cited by examiner

BAFFLE AND ASSOCIATED FRYER HEAT EXCHANGE SYSTEM AND FRYER

TECHNICAL FIELD

The present invention relates generally to heat-exchange systems used in deep-fat fryers and, more particularly, to a deep-fat fryer baffle heat exchange system.

BACKGROUND

A typical deep-fat fryer includes a fryer vat containing a heated bath of cooking oil. The cooking oil vat is adapted to receive baskets of food products such that the food products will be immersed within and cooked by the heated cooking oil. Such fryers include a heat exchanger, which often takes the form of one or more in vat or through vat heat exchange tubes through which combusted gases pass, thereby delivering heat to the oil through the tube walls. Baffles may be incorporated into the heat exchange tubes to cause a turbulent combustion gas flow that more effectively transfers heat from the combustion gases to the tube walls, and thereby to the oil surrounding the heat exchange tubes. Such baffles are, however, subject to failure due to the extreme heat conditions within the heat exchange tubes, and such failures can reduce fryer efficiency.

It would be desirable to provide a fryer and associated heat exchange tube and baffle system that effectively and efficiently heats oil in the fryer vat while reducing the likelihood of baffle failure.

SUMMARY

In one aspect, a fryer includes a fryer vat defining a volume for receiving oil to be heated for cooking, and a heating system for heating oil in the volume. The heating system includes at least one gaseous fuel burner associated with at least one heat exchange tube, the heat exchange tube passing through the volume such that an external surface of the heat exchange tube will be in contact with oil in the volume, the heat exchange tube defining an internal passage, from a burner end of the heat exchange tube to a discharge end of the heat exchange tube, through which heated combustion gases of the gaseous fuel burner can pass, and a baffle within the internal passage for enhancing heat transfer from the combustion gases to the heat exchange tube. The baffle includes a plurality baffle panels that are interconnected and sequentially arranged along an axial length of the baffle, each baffle panel extending at least partially across the internal passage of the heat exchange tube, each baffle panel including a plurality of openings therethrough. A first baffle panel, of the plurality of baffle panels, includes multiple sets of interconnected openings, wherein the openings of each set are interconnected with each other by one or more through slits formed in the first baffle panel so as to facilitate thermal expansion of the first baffle panel, wherein the first baffle panel is located closer to the burner end of the heat exchange tube than any other baffle panels of the baffle.

In another aspect, a fryer includes a fryer vat defining a volume for receiving oil to be heated for cooking, and a heating system for heating oil in the volume. The heating system includes a heat exchange tube passing through the volume, the heat exchange tube having a burner end, an opposite end, and an internal passage from the burner end to the opposite end, a baffle within the internal passage for enhancing heat transfer from combustion gases to the heat exchange tube. The baffle has an axial length from a burner facing end to a discharge facing end, wherein the baffle comprises a plurality baffle panels that are interconnected and sequentially arranged along the axial length, each baffle panel extending at least partially across the internal passage of the heat exchange tube. Each of at least a first baffle panel and a second baffle panel, of the plurality of baffle panels, includes multiple sets of interconnected openings, wherein the openings of each set are interconnected with each other by one or more panel through slits so as to facilitate thermal expansion, wherein the first baffle panel and the second baffle panel are located at the burner facing end of the baffle.

The details of one or more embodiments are set forth in the accompanying drawings and the description below. Other features, objects, and advantages will be apparent from the description and drawings, and from the claims.

DETAILED DESCRIPTION

Figure 1:
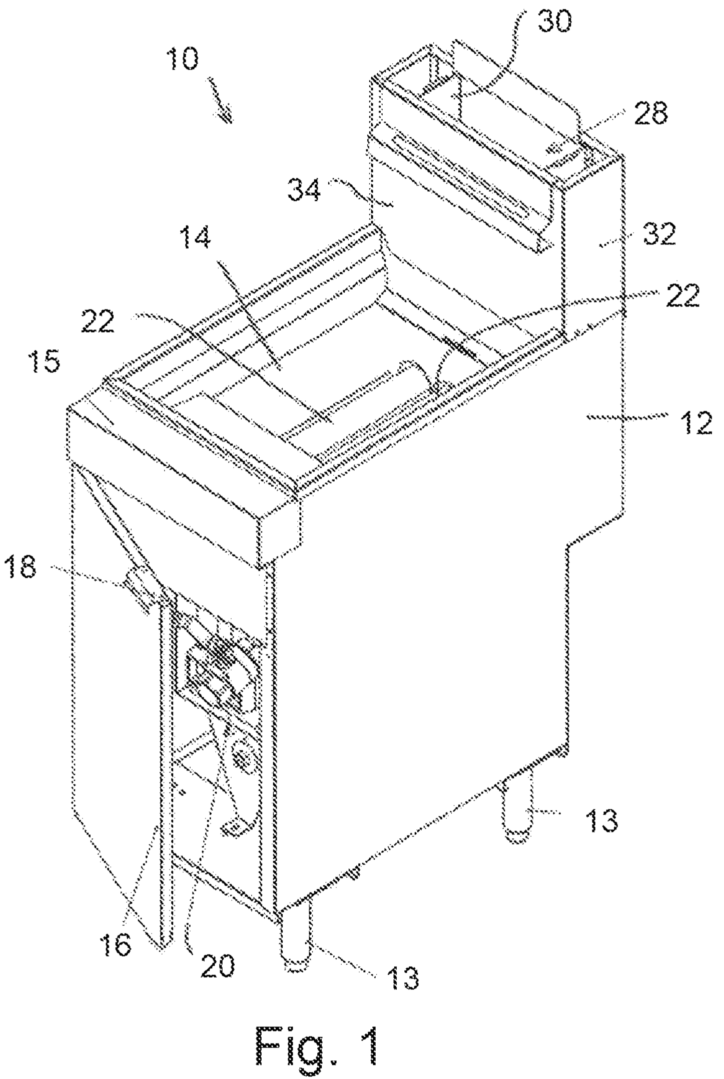
FIG. 1 shows a perspective view of a fryer.
Figure 2:
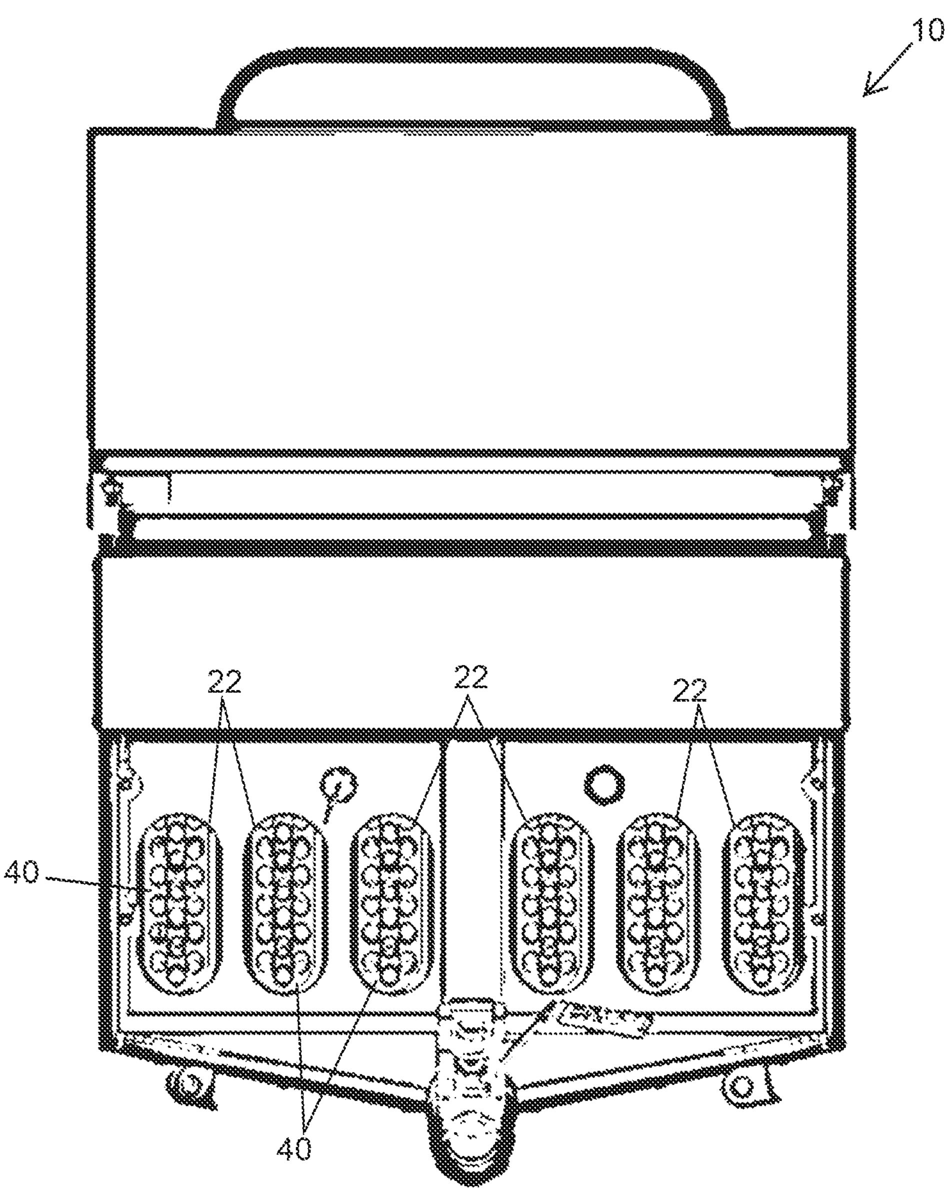
FIG. 2 shows a partial schematic front elevation of the fryer (door removed)
Figure 3:
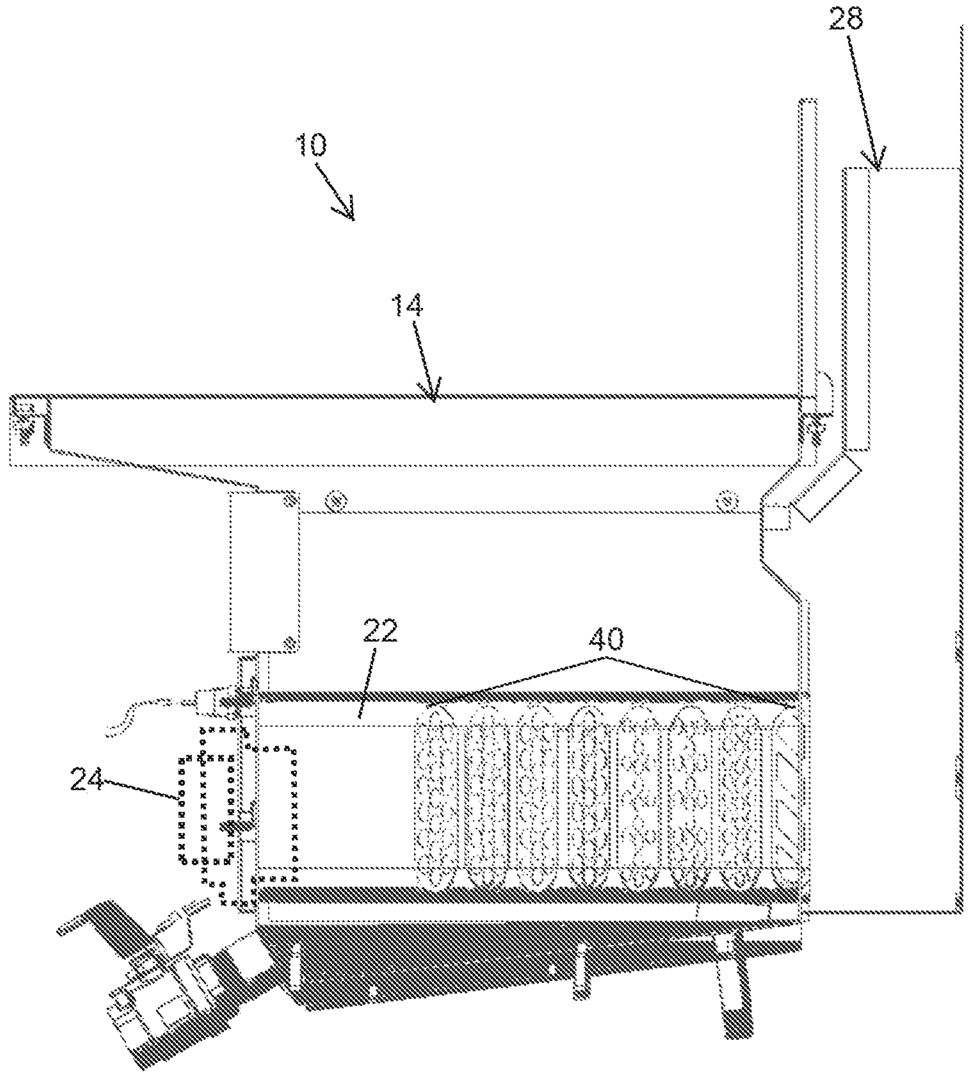
FIG. 3 shows a partial schematic side elevation of the fryer.
Figure 4:
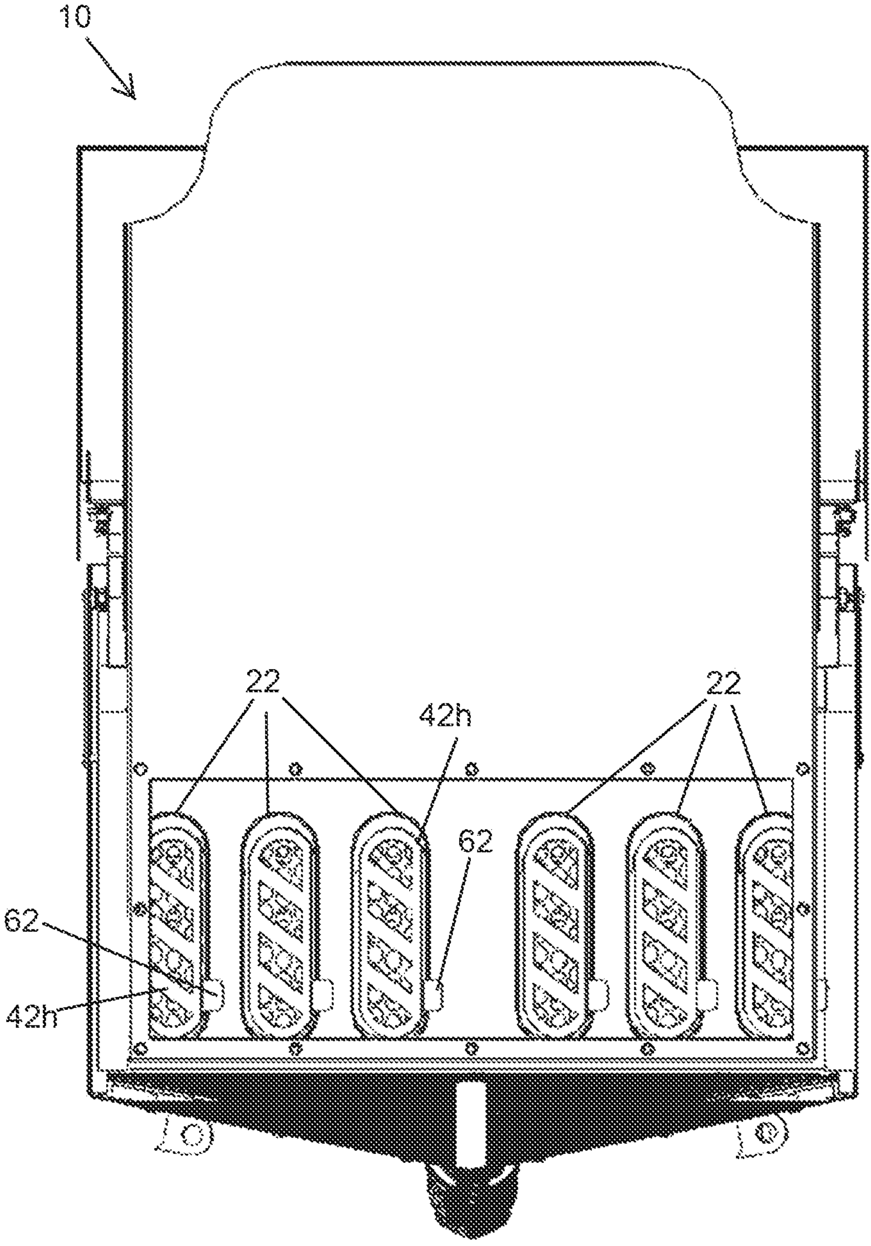
FIG. 4 shows a partial schematic rear elevation of the fryer (back wall panel removed)

Referring to FIGS. 1-4, a fryer 10 includes a housing 12 that supports an open-top vat 14 having front, rear, left, right and bottom side wall portions. Legs 13 support the housing and a front shelf area 15 is provided. The vat 14 walls may, for example, be formed of stainless steel or aluminum sheet metal that is formed and welded. The volume of the vat may vary widely, but typically holds about 30 to 90 pounds of oil. An access door 16 and handle 18 at the front of the fryer moves between open and closed positions to permit access to internal components, including the front side of the vat and portions of a heating system 20 associated with the fryer vat for heating oil within the fryer vat.

The fryer housing structure to which the vat is attached may include edge portions extending upward from the right and left sides of the vat, a front portion 15 extending laterally forward of the front of the vat to an upwardly extending front edge portion, and a back portion including an upwardly extending rear wall 34 formed by part of the chimney shell 32. Here, the rear wall 34 extends upward to a height well above the height of the left, right and front edge portions. Additional housing structure and/or support frame structure may be associated with the bottom portion of the fryer vat as well.

The oil heating system 20 includes one or more (here six, per the front elevation of FIG. 2) heat exchange tubes 22, each with an associated gaseous fuel burner 24 (shown schematically in FIG. 3) at a burner end of the tube. The heat exchange tubes 22 extend from a front side of the fryer vat (here, the burner end of the tubes) to a read side of the fryer vat (here the discharge end of the tubes), and may be integrated with the fryer vat as a unit, such as where a front edge of each heat exchange tube is welded to the front wall of the fryer vat and a rear edge of each heat exchange tube is welded to the rear wall of the fryer vat. The heat exchange tubes 22 are immersed in oil within the vat and therefore heat exchange occurs between combustion gases in the heat exchange tubes and the oil in the vat through the wall(s) of heat exchange tubes. During frying operations, when oil in the vat is being heated, gaseous fuel is fed to the burners 24 and combusted at the front of each heat exchange tube, and the combustion gases then traverse the length of the tubes (e.g., from left to right in the side view of FIG. 3) toward the rear side of the fryer, where the combustion gases then move up through an exhaust chimney 28 formed by a liner 30 and shell 32. Each heat exchange tube 22 includes an internal baffle 40 that is configured to promote a flow within the tube that enhances heat exchange from the combustion gases, through the tube wall and to the oil within the vat.

Figures 5, 6:
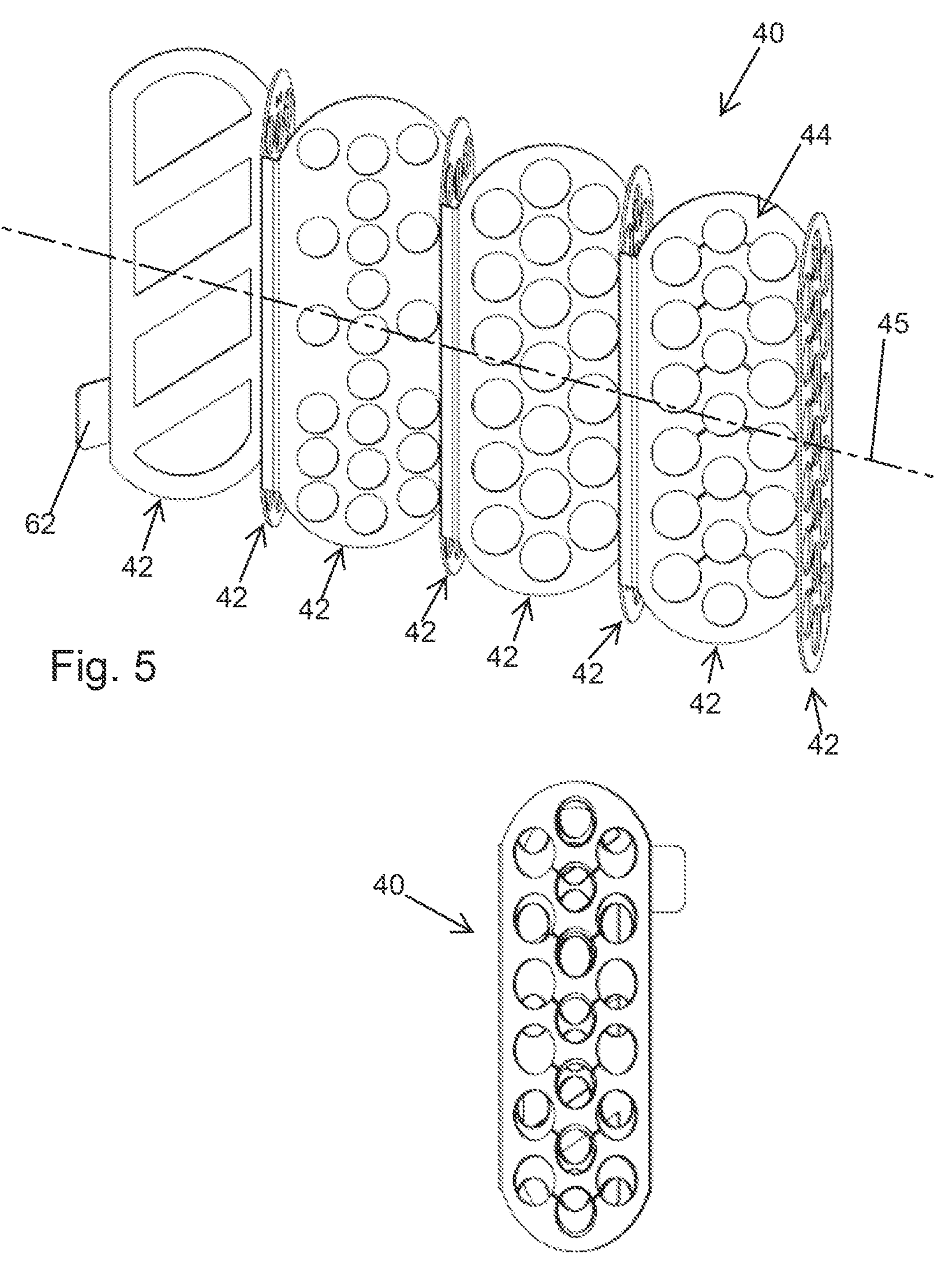
FIG. 5 shows a perspective view of a baffle.
FIG. 6 shows a front elevation of the baffle.
Figure 7:
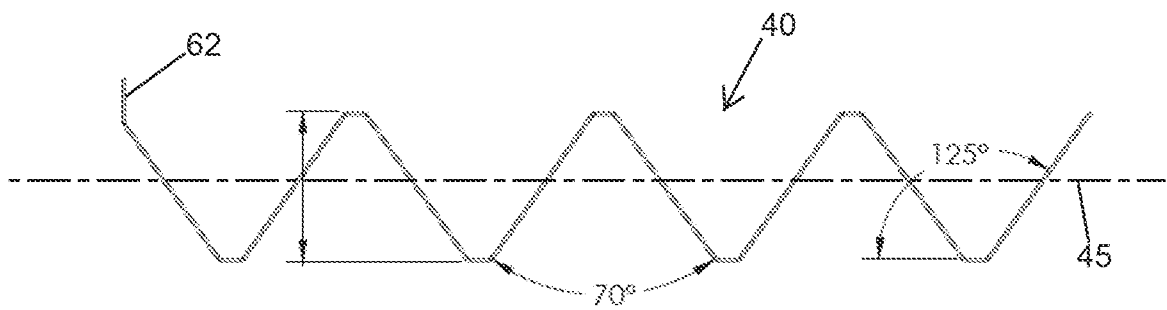
FIG. 7 shows a top plan view of the baffle.
Figure 8:
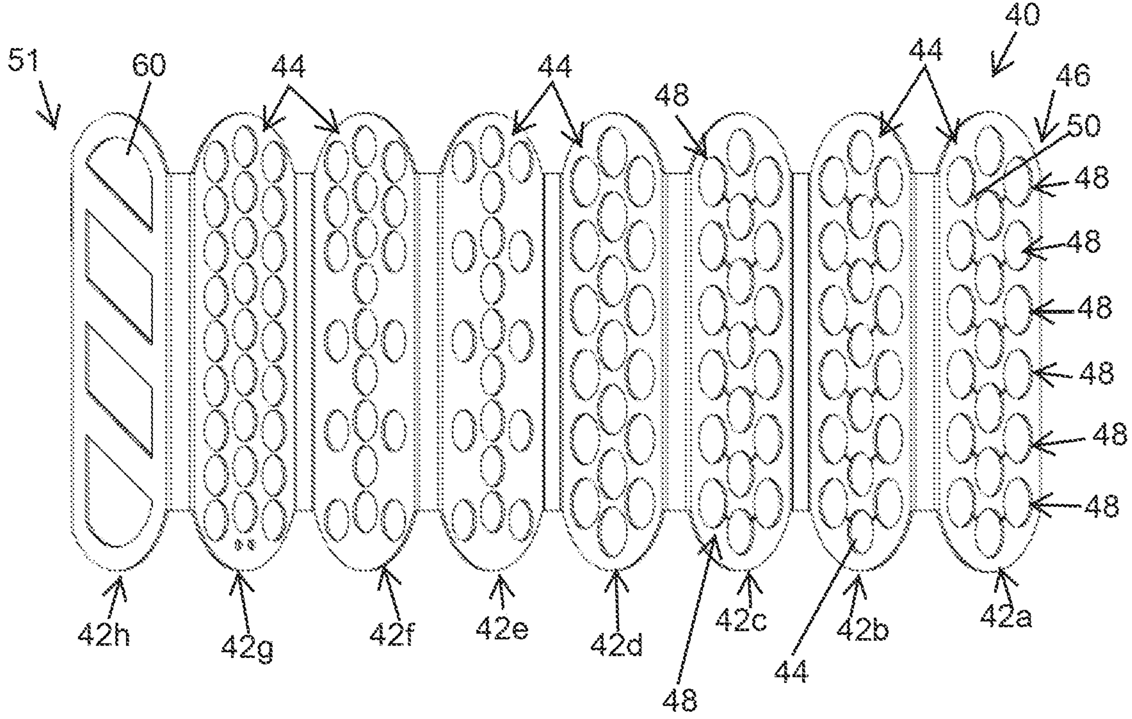
FIG. 8 shows a side elevation of the baffle.
Figure 9:
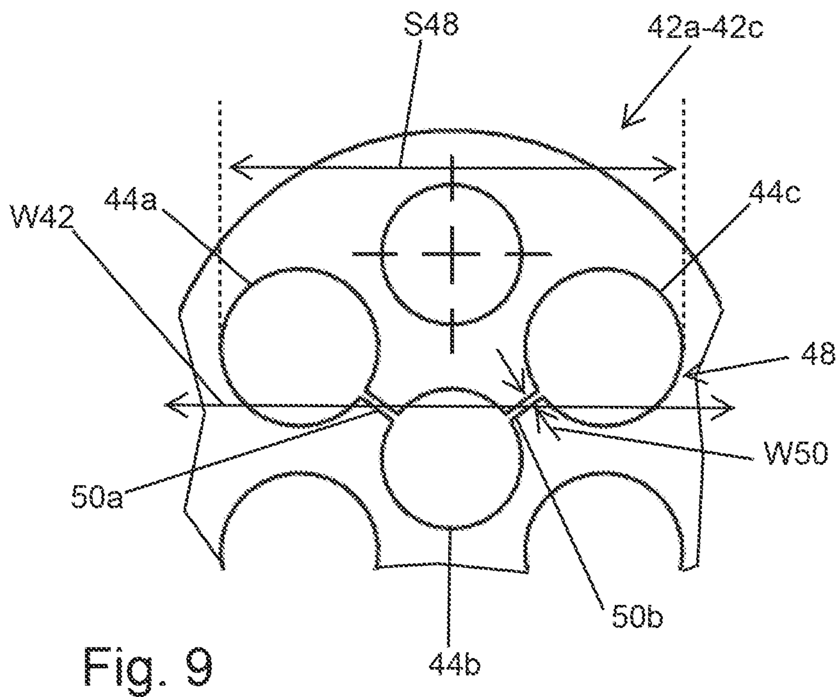
FIG. 9 shows a partial view of a set of interconnected openings on one of the baffle plates.
Figure 10:
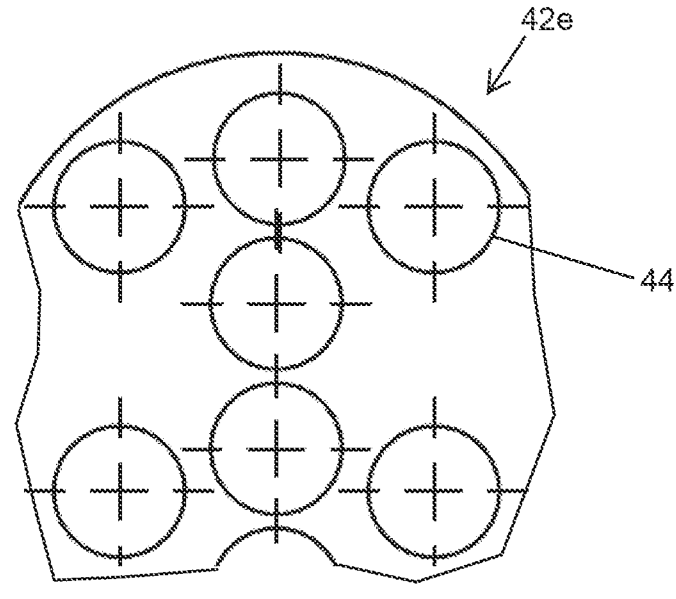
FIG. 10 shows a partial view of openings on another one of the baffle plates.

Referring additionally to FIGS. 5-10, in one implementation, the baffle 40 is formed by a plurality of baffle panels 42 that are interconnected with each other and, here, arranged in a serpentine pattern along a central, lengthwise axis 45 of the baffle. Each baffle panel includes through openings 44. The baffle panels 42*a*-42*c* that are located toward the burner facing end 46 of the baffle 40 include multiple sets 48 of openings 44, with the openings of each set interconnected with each other by through slits 50 formed in the baffle panel. These through slits 50 facilitate thermal expansion of the baffle panels. Such thermal expansion is most important for the baffle panels located closer to the burner end of the heat exchange tube, due to the more extreme heat conditions. Here, the baffle panel 42*a* is located closer to the burner end of the heat exchange tube 24 than any other baffle panels of the baffle, followed sequentially by baffle panel 42*b* and then baffle panel 42*c*

Here, each set 48 of openings 44 of the baffle panels 42-42*c* comprise three openings 44*a*, 44*b*, 44*c*, with one through slit 50*a* interconnecting the openings 44*a* and 44*b*, and another through slit 50*b* interconnecting the openings 44*b* and 44*c*. However, the number of openings included in each set could vary (e.g., only two, or more than three). Here, the openings 44*a*-44*c* are circular and the through slits 50*a* and 50*b* are linear, but other variations are possible. By way of example, a width W50 of each through slit may be less than one millimeter, and the width of each through slit 50 may be no more than ten percent of the diameter of the openings 44 (e.g., no more than five percent of the diameter). In the case of openings that are not circular, the width of each through slit may be no more than ten percent of a largest cross-dimension of the opening (e.g., no more than five percent of the largest cross-dimension). Here, each baffle panel 42*a*-42*c* includes six opening sets 48 arranged along a height of the baffle panel, but the number and positioning of the opening sets could vary.

Notably, here, each set 48 of interconnected openings on a panel spans a lateral dimension S48 that is at least seventy percent of the total width W42 of the panel (e.g., S48 at least eighty percent of W42).

The baffle panels 42*d*-42*g* located further away from the burner (toward the discharge facing end 51 of the baffle) also include openings 44, but the baffle panels 42*d*-42*g* do not have any through slits, because thermal expansion requirements are not as demanding for such baffle panels. The last baffle panel 42*h* includes larger openings 60, but no through slits. The last baffle panel 42*h* also carries a tab 62 to facilitate positioning of the baffle 40 into the heat exchange tube from the discharge end of the heat exchange tube.

The subject baffle 40 promotes effective heat exchange with the tubes 22, and at the same time reduces the likelihood of baffle failure.

It is to be clearly understood that the above description is intended by way of illustration and example only, is not intended to be taken by way of limitation, and that other changes and modifications are possible. For example, although the illustrated baffle 40 includes three baffle panels 42*a*-42 that have set of interconnected openings with interconnecting slits and five baffle panels 42*d*-42*h* that do not have sets of openings with interconnecting slits, those numbers could vary. Embodiments in which all of the baffle panels have sets of openings with interconnecting through slits are possible.

The invention claimed is:

1. A fryer, comprising:

a fryer vat defining a volume for receiving oil to be heated for cooking;

a heating system for heating oil in the volume, the heating system including at least one gaseous fuel burner associated with at least one heat exchange tube, the heat exchange tube passing through the volume such that an external surface of the heat exchange tube will be in contact with oil in the volume, the heat exchange tube defining an internal passage, from a burner end of the heat exchange tube to a discharge end of the heat exchange tube, through which heated combustion gases of the gaseous fuel burner can pass, and a baffle within the internal passage for enhancing heat transfer from the combustion gases to the heat exchange tube;

wherein the baffle comprises a plurality baffle panels that are interconnected and sequentially arranged along an axial length of the baffle, each baffle panel extending at least partially across the internal passage of the heat exchange tube, each baffle panel including a plurality of openings therethrough;

wherein a first baffle panel, of the plurality of baffle panels, includes multiple sets of interconnected openings, wherein the openings of each set are interconnected with each other by one or more through slits formed in the first baffle panel so as to facilitate thermal expansion of the first baffle panel, wherein the first baffle panel is located closer to the burner end of the heat exchange tube than any other baffle panels of the baffle.

2. The fryer of claim 1, wherein each set of interconnected openings of the first baffle panel comprises at least first, second and third openings, with a first slit, of the one or more slits, interconnecting the first opening and the second opening, and a second slit, of the one or more slits, interconnecting the second opening and the third opening.

3. The fryer of claim 1, wherein the multiple sets of interconnected openings comprise at least three sets of interconnected openings.

4. The fryer of claim 1, wherein a second baffle panel, of the plurality of baffle panels, includes multiple sets of interconnected openings, wherein the openings of each set on the second baffle panel are interconnected with each other by one or more through slits formed in the second baffle panel so as to facilitate thermal expansion of the second baffle panel, wherein the second baffle panel is located sequentially adjacent the first baffle panel.

5. The fryer of claim 4, wherein a third baffle panel, of the plurality of baffle panels, includes multiple sets of interconnected openings, wherein the openings of each set on the third baffle panel are interconnected with each other by one or more through slits formed in the third baffle panel so as to facilitate thermal expansion of the third baffle panel, wherein the third baffle panel is located sequentially adjacent the second baffle panel.

6. The fryer of claim 4, wherein at least two baffle panels, of the plurality of baffle panels, lack any through slits between openings.

7. The fryer of claim 6, wherein the at least two baffle panels are located toward the discharge end of the heat exchange tube.

8. The fryer of claim 1, wherein for each set of interconnected openings, the openings are circular and the one or more through slits are linear.

9. The fryer of claim 1, wherein the plurality baffle panels are interconnected and sequentially arranged in a serpentine pattern.

10. The fryer of claim 1, wherein for at least one set of interconnected openings, a lateral span of the set of interconnected openings is at least 70% of a total width of the first baffle panel.

11. A fryer, comprising:

a fryer vat defining a volume for receiving oil to be heated for cooking;

a heating system for heating oil in the volume, the heating system including a heat exchange tube passing through the volume, the heat exchange tube having a burner end, an opposite end, and an internal passage from the burner end to the opposite end, a baffle within the internal passage for enhancing heat transfer from combustion gases to the heat exchange tube;

wherein the baffle has an axial length from a burner facing end to a discharge facing end, wherein the baffle comprises a plurality baffle panels that are interconnected and sequentially arranged along the axial length, each baffle panel extending at least partially across the internal passage of the heat exchange tube;

wherein each of at least a first baffle panel and a second baffle panel, of the plurality of baffle panels, includes multiple sets of interconnected openings, wherein the openings of each set are interconnected with each other by one or more panel through slits so as to facilitate thermal expansion, wherein the first baffle panel and the second baffle panel are located at the burner facing end of the baffle.

12. The fryer of claim 11, wherein each of at least a third baffle panel and a fourth baffle panel, of the plurality of baffle panels, includes a plurality of openings and no interconnecting through slits, wherein the third baffle panel and the fourth baffle panel are located at the discharge facing end of the baffle.

13. The fryer of claim 12, wherein at least one further baffle panel, of the plurality of baffle panels, is located axially between the second baffle panel and the third baffle panel.

14. The fryer of claim 11, wherein, for each of the first baffle panel and the second baffle panel, each set of interconnected openings comprises at least first, second and third openings, with a first slit, of the one or more slits, interconnecting the first opening and the second opening, and a second slit, of the one or more slits, interconnecting the second opening and the third opening.

15. The fryer of claim 11, wherein, for each of the first baffle panel and the second baffle panel, the openings of each set of interconnected openings are circular and the one or more through slits are linear.

16. A baffle for use in in a fryer having a fryer vat defining a volume for receiving oil to be heated for cooking and a gaseous fuel heating system for heating oil in the volume, with at least one heat exchange tube passing through the volume and defining an internal passage, from a burner end of the heat exchange tube to a discharge end of the heat exchange tube, wherein the baffle is configured to be positioned within the internal passage for enhancing heat transfer from combustion gases to the heat exchange tube, the baffle comprising:

a plurality baffle panels that are interconnected and sequentially arranged along an axial length of the baffle, each baffle panel extending at least partially across the internal passage of the heat exchange tube, a multiplicity of the baffle panels including a plurality of openings therethrough, wherein a first baffle panel, of the plurality of baffle panels, includes multiple sets of interconnected openings distributed along a height of the first baffle panel, wherein the openings of each set are interconnected with each other by one or more through slits formed in the first baffle panel so as to facilitate thermal expansion of the first baffle panel, wherein the first baffle panel is located closer to a burner end of the baffle than any other baffle panels of the baffle.

17. The baffle of claim 16, wherein for each set of interconnected openings, the openings are circular and the one or more through slits are linear.

18. The baffle of claim 16, wherein for at least one set of interconnected openings, a lateral span of the set of interconnected openings is at least 70% of a total width of the first baffle panel.

19. The baffle of claim 16, wherein a second baffle panel, of the plurality of baffle panels, includes multiple sets of interconnected openings, wherein the openings of each set on the second baffle panel are interconnected with each other by one or more through slits formed in the second baffle panel so as to facilitate thermal expansion of the second baffle panel, wherein the second baffle panel is located sequentially adjacent the first baffle panel.

20. The baffle of claim 19, wherein at least two baffle panels, of the plurality of baffle panels, lack any through slits between openings.

* * * * *